UNITED STATES PATENT OFFICE.

JAMES N. G. SINGLETON, OF ORLANDO, FLORIDA.

TREATING CITRUS FRUITS.

1,093,081. Specification of Letters Patent. Patented Apr. 14, 1914.

No Drawing. Application filed August 18, 1913. Serial No. 785,400.

*To all whom it may concern:*

Be it known that I, JAMES N. G. SINGLETON, a citizen of the United States, residing at Orlando, in the county of Orange and State of Florida, have invented new and useful Improvements in Treating Citrus Fruits, of which the following is a specification.

This invention relates to improvements in the art of treating citrus fruits for producing extracts and syrups.

The object of this invention is to produce an extract from citrus fruit, particularly grape fruit, that will possess the full flavor of the fruit and can be bottled for use as a beverage, and then to treat the extract so formed that it may be used as a syrup particularly adapted for use in soda fountains.

This invention is carried out in the following manner. The juice is removed from the grape fruit and a sufficient quantity of cane sugar added to the extracted juice which is then set aside in a receptacle until fermentation takes place. The rind is cut up into small pieces and placed in a kettle to which is added about one-quarter its volume of water and boiled slowly until the rind has become thoroughly saturated and the excess of water evaporated. The saturated rind is then squeezed and the solution thus obtained is strained and set aside. The rind pulp is then boiled a second time with about one-quarter of its volume of water, but for a less length of time, squeezed and the solution strained and added to the first rind solution. To this rind solution is added the fermented juice in the ratio of one pint of juice to each quart of solution and boiled slowly to the jell line, that is to the point just before which the compound will become a jelly. This is called the extract of grape fruit and should be bottled while still hot and sealed with an air tight closure.

The syrup of grape fruit is formed by adding to the extract, as described above, an equal amount of cane sugar and twice as much of the fermented juice which is then boiled slowly until the syrup line is reached. It will be seen that besides the rind and the juice of the fruit itself only cane sugar and water are used, and therefore the extract and syrup are pure, wholesome and full flavored.

What I claim is:—

1. The process of treating citrus fruit which consists in separating the juice from the rind, adding cane sugar to the juice and allowing it to ferment, boiling slowly the rind with about one-quarter of its volume of water until the rind becomes saturated and the excess water evaporated, squeezing the saturated rind, straining the solution obtained thereby, boiling the rind pulp again with about one-quarter of its volume of water for a shorter time, squeezing the saturated rind, straining the solution and adding to the first rind solution, adding to the solution the fermented juice, one pint of juice to each quart of rind solution, and boiling slowly to the jell line.

2. The process of treating citrus fruit which consists in separating the juice from the rind, adding cane sugar to the juice and allowing it to ferment, boiling slowly the rind with about one-quarter of its volume of water until the rind becomes saturated and the excess water evaporated, squeezing the saturated rind, straining the solution obtained thereby, boiling the rind pulp again with about one-quarter of its volume of water for a shorter time, squeezing the saturated rind, straining the solution and adding to the first rind solution, adding to the solution the fermented juice, one pint of juice to each quart of rind solution, and boiling slowly to the jell line, adding an equal amount of cane sugar and twice as much fermented juice and boiling slowly until the syrup line is reached.

JAMES N. G. SINGLETON.

Witnesses:
N. P. HATCHER,
G. O. HATCHER.

Copies of this patent may be obtained for five cents each, by addressing the "Commissioner of Patents, Washington, D. C."